United States Patent Office 3,246,674
Patented Apr. 19, 1966

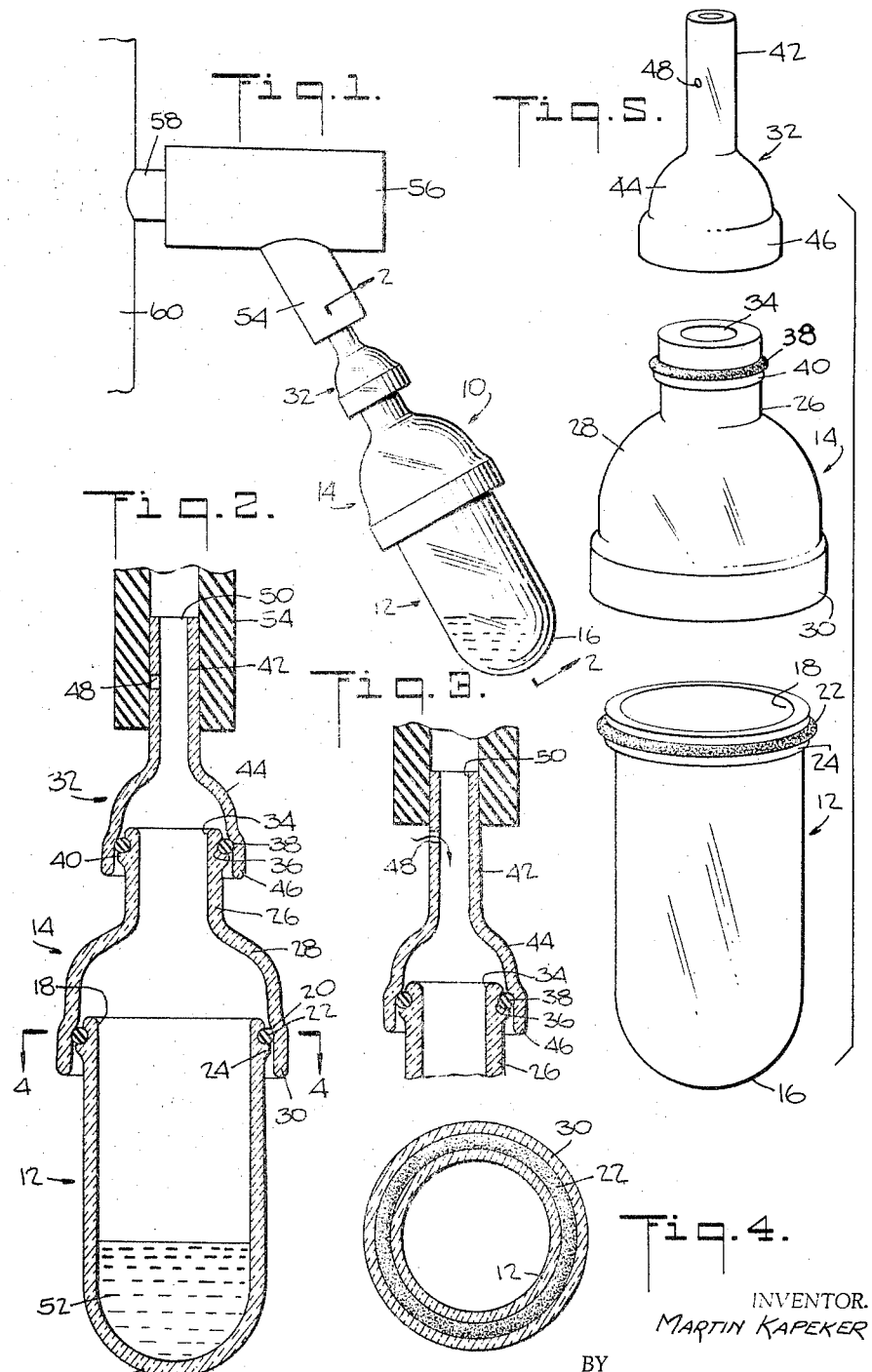

3,246,674
VACUUM FLASK AND COUPLING
Martin Kapeker, Brooklyn, N.Y., assignor to Thermovac Industries Corp., Copiague, N.Y., a corporation of New York
Filed June 12, 1963, Ser. No. 287,277
10 Claims. (Cl. 141—363)

This invention relates to the field of freeze drying, and has for its objective the creation of a dehydration, or vacuum, flask, and a coupling by which the flask is secured to a freeze dryer for the purpose of dehydrating organic material contained in the flask.

In the present state of the art there are several types of dehydration, or vacuum, flasks in use, none of which is completely satisfactory. In one form the flask comprises a body section and a cover section having no interconnection means, the flat bottom edge of the cover being seated upon the flat upper edge of the body, and held together by the vacuum suction produced by the freeze dryer in operation. A silicone grease is interposed between the two edges to help maintain an air seal. As is obvious, the connection of such a flask to the freeze dryer requires at least two persons, or three hands, one to hold the body section, one to hold the cover to it, and a third to connect the flask to the freeze dryer, the cover and body sections requiring continued manual attention to maintain engagement of the parts until the vacuum suction is strong enough to take over.

Another type of flask now in use requires an external coupling of wide and heavy rubber, provided with a pair of parallel internal grooves, with the top edge of the body section fitting into the lower groove and the bottom edge of the cover fitting into the upper groove, whereby the rubber coupling holds the two parts together. This type of flask has also been found unsatisfactory for the reason that such couplings are large, cumbersome and expensive, and because the stretching of the rubber coupling weakens the air seal necessary between the cover and the body of the flask. Additionally, such rubber couplings are difficult to keep clean.

It is therefore the principal object of my invention to create a vacuum flask provided with internal means for locking the body to the cover in air tight engagement.

A second important object of my invention lies in the provision of an automatically locking vacuum flask in combination with an internally locking coupling adapted to secure the flask to the freeze dryer.

A third important object of my invention lies in the provision of a combination vacuum flask and coupling which are quickly and easily detachable from each other.

A fourth important object of my invention lies in the provision of a coupling provided with means for breaking the vacuum gently in order to remove the flask from the freeze dryer.

Still another important object of my invention lies in the provision of a combination vacuum flask and coupling which is simple to operate, and time-saving.

These and other salient objects, advantages and functional features of my invention, together with the novel features of construction, composition and arrangement of parts, will be more readily apparent from an examination of the following description, taken with the accompanying drawings, wherein:

FIG. 1 is a side prespective view of a preferred embodiment of my invention, shown in valve engagement with a port of a freeze dryer;

FIG. 2 is an enlarged cross-sectional view, taken on lines 2—2 of FIG. 1;

FIG. 3 is an enlarged cross-sectional view, similar to FIG. 2, but showing the coupling partially withdrawn from the valve;

FIG. 4 is a cross-sectional view, taken on lines 4—4 of FIG. 2; and

FIG. 5 is an exploded view of the embodiment shown in FIG. 1.

Similar reference characters designate similar parts throughout the different views.

Illustrative of the embodiment shown, my vacuum flask 10 comprises a body portion 12 and a cover 14. The flask 10 is preferably made of glass, although similar, suitable material, such as plastic, may be substituted therefor. The body 12 is cylindrical, and is provided with a rounded bottom 16 and a mouth 18 having the same diameter as the internal wall of the body 12. The body 12 may be formed in other shapes, as well, but it has been found that the contour above described, and shown by the drawings, is most suited for optimum dehydration, as is well known in the art. Adjacent the mouth 18 the body 12 is provided with a perhipheral groove 20 adapted to receive and retain an annular gasket or ring 22 of resilient rubber or other suitable material, which is disposed to extend beyond the outer surface of the body 12. The normal diameter of the ring 22 is smaller than that of the groove 20, and is stretched to fit therein. Immediately below the groove 20 the body 12 is provided with a peripheral shoulder 24, which is adapted and disposed to prevent downward dislocation of the ring 22 when it is engaged by the cover 14, as will hereinafter be explained.

The cover 14 comprises a neck portion 26 which flares into an enlarged bell-shaped central portion 28, from which there extends an enlarged skirt 30 which forms the base of the cover 14. The diameter of the shoulder 24 of the body 12 is smaller than the diameter of the skirt 30, but larger than the bottom diameter of the central portion 28, and the diameter of the ring 22, when positioned in the groove 20, is slightly larger than the diameter of the skirt 30, so that the cover 14 may be forced around the body 12, to be held thereto by the frictional engagement with, and pressure against, the ring 22 by the skirt 30.

A similar arrangement is provided for the engagement of the cover 14 with the coupling 32. The cover 14 is provided, adajcent its upper opening 34, with a peripheral groove 36 adapted to receive and retain an annular gasket or ring 38 of rubber, disposed to extend therefrom beyond the outer surface of the neck 26. The ring 38 normally has a smaller diameter than the groove 36, but is stretched to fit therein. A peripheral shoulder 40 is provided below the groove 36 to prevent downward dislocation of the ring 38 when it is engaged by the coupling 32, as will hereinafter be explained.

The coupling 32 comprises a thin stem 42 which flares into an enlarged, bell-shaped central portion 44 from which there extends an enlarged skirt 46 which forms the base of the coupling 32. The diameter of the shoulder 40 is smaller than the diameter of the skirt 46 but larger than the bottom diameter of the central portion 44, and the diameter of the ring 38, when positioned within the groove 36, is slightly larger than the diameter of the skirt 46, so that the coupling 32 may be forced around the cover 14, to be held thereto by frictional engagement with, and pressure against, the ring 38 by the skirt 46, while the shoulder 40 prevents entry of the cover 14 into the coupling 32 beyond its skirt 46, just as the shoulder 24 prevents entry of the body 12 into the cover 14 beyond its respective skirt 30. The stem 42 of the coupling 32 is provided with an air opening 48 in its wall, midway between its mouth 50 and its union with the central portion 44. More than one opening 48 may be provided around the stem 42 at such midway point, if desired.

In the operation of my vacuum flask 10 and coupling 32, the body 12, containing organic material 52 to be dehydrated, is frictionally attached to the cover 14 by the engagement of the ring 22 with the skirt 30. The cover 14 is frictionally attached to the coupling 32 in the same manner, by the engagement of the ring 38 with the skirt 46. The stem 42 of the coupling 32 is then inserted into the connection tube 54 of the vacuum valve 56 which is mounted upon a port 58 of the freeze dryer manifold 60, with the opening 48 in the stem 42 in airtight engagement with the inside wall of the tube 54, as shown in FIG. 2. The valve 56 is then moved outwardly upon the port 58 to provide a direct opening from the port 58 into the flask 10, as is described more fully in my co-pending application Serial No. 258,036, filed February 12, 1963, now U.S. Patent No. 3,165,386 for "Vacuum Valve," to start the dehydration process by low temperature, high vacuum freeze drying. When the dehydration of the organic material 52 has been completed, the valve 56 is moved to close off the port 58, and the coupling stem 42 is withdrawn from the connecting tube 54 until the opening 48 is exposed. This exposure to air gently breaks the vacuum within the flask 10, permitting ready detachment of the body 12 from the cover 14, and the cover 14 from the coupling 32. A new flask 10, filled with organic material to be dehydrated, may now be connected to the coupling 32, and the process repeated.

It is to be noted that, while in the preferred embodiment hereinabove described the flask 10 and coupling 32 are made of glass, other suitable materials may be substituted for either, or both. For example, the flask 10 may be made of glass, or plastic, and the coupling 32 may be formed of some suitable metal, and the combination will achieve equally satisfactory results.

It is also to be noted that, while my invention is particularly directed to vacuum flasks and couplings, the novel features of construction and cooperation may be applied to other types of containers and coupling connections for different purposes and uses.

The embodiment thus shown and described, therefore, is by way of illustration and not of limitation, and various changes may be made in the construction, composition and arrangement of parts without limitation upon or departure from the spirit and scope of the invention, or sacrificing any of the advantages thereof inherent therein, all of which are claimed.

Having described my invention, I claim:

1. A vacuum flask comprising an open top hollow body portion and a cover therefor, the body portion provided externally with an annular groove adjacent its opening and a peripheral shoulder below the groove, a resilient ring disposed within the groove and extending therefrom beyond the shoulder, the cover comprising an open top hollow neck, a flared central portion and an enlarged skirt forming the base of the cover, the skirt being of a diameter to frictionally engage the ring on the body portion.

2. A vacuum flask as described in claim 1, the cover being further provided externally with an annular groove around its neck adjacent the opening thereof and a peripheral shoulder below the groove, a resilient ring disposed within the groove and extending therefrom beyond the shoulder thereof.

3. A vacuum flask as described in claim 1, the internal diameter of the central portion of the cover being smaller than the external diameter of the body shoulder.

4. A vacuum flask as described in claim 2, the internal diameter of the central portion of the cover being smaller than the external diameter of the body shoulder.

5. A vacuum flask as described in claim 4, in combination with a coupling, the coupling comprising an open top hollow stem, a flared central portion and an enlarged skirt forming the base of the coupling, the coupling skirt being of a diameter to frictionally engage the ring on the cover.

6. A vacuum flask and coupling as described in claim 5, the internal diameter of the central portion of the coupling being smaller than the external diameter of the cover shoulder.

7. A vacuum flask and coupling as described in claim 5, the coupling stem being further provided with air vent means.

8. A vacuum flask and coupling as described in claim 6, the coupling stem being further provided with air vent means.

9. A vacuum flask and coupling as described in claim 6, the coupling stem being further provided centrally with an air opening.

10. Circular coupling means for engagement of a male element with a female element comprising an external annular groove around the male element, a peripheral shoulder behind the groove and abutting same and a resilient ring disposed within the groove and extending therefrom beyond the shoulder, the internal diameter of the female element being greater than the external diameter of the shoulder but smaller than the external diameter of the resilient ring up to their point of engagement, and the internal diameter of the female element being otherwise smaller than the external diameter of the male element.

References Cited by the Examiner

UNITED STATES PATENTS

| | | | |
|---|---|---|---|
| 709,401 | 9/1902 | Henderson. | |
| 884,275 | 4/1908 | Haywood | 285—177 X |
| 901,545 | 10/1908 | Morrison | 285—177 X |
| 2,516,743 | 7/1950 | Allin | 285—347 X |
| 2,859,534 | 11/1958 | Copson | 34—5 X |

FOREIGN PATENTS 9,765   2/1894   Great Britain.

LAVERNE D. GEIGER, *Primary Examiner.*

H. BELL, *Assistant Examiner.*